United States Patent [19]
Saito et al.

[11] Patent Number: 4,788,576
[45] Date of Patent: Nov. 29, 1988

[54] MICROFILM DUPLICATING APPARATUS

[75] Inventors: Eiichi Saito, Minami-ashigara; Sadaaki Nakaoka, Osaka; Kuniomi Abe, Kobe; Takeshi Okano, Nishinomiya, all of Japan

[73] Assignee: Fuji Photo Film Co., Ltd., Kanagawa, Japan

[21] Appl. No.: 62,646

[22] Filed: Jun. 16, 1987

[30] Foreign Application Priority Data

Jun. 16, 1986 [JP] Japan ................................ 61-140498
Jun. 19, 1986 [JP] Japan ................................ 61-144302
Jun. 19, 1986 [JP] Japan ................................ 61-144303

[51] Int. Cl.$^4$ ................................ G03B 27/52
[52] U.S. Cl. ................................ 355/43; 355/45; 355/66; 355/54
[58] Field of Search ........................ 355/43, 45, 54, 66

[56] References Cited

U.S. PATENT DOCUMENTS 4,181,427 1/1980 Rotter .................................. 355/43
4,324,484 4/1982 Johnson ........................... 355/45 X

*Primary Examiner*—L. T. Hix
*Assistant Examiner*—D. Rutledge
*Attorney, Agent, or Firm*—Sughrue, Mion, Zinn, Macpeak & Seas

[57] ABSTRACT

A microfilm duplicating apparatus for duplicating images, recorded on a master film onto a photographic duplicate film, comprising a light source for illuminating any one of the images on the master film from rear, a single reflective mirror for reflecting a luminous flux, which has been emitted from the light source and passed through the master film while carrying the image to be duplicated, so as to travel towards the duplicate film, and an image forming lens assembly consisting of two facing lenses of equal focal length disposed on the path of travel of the luminous flux.

4 Claims, 9 Drawing Sheets

MICROFILM DUPLICATING APPARATUS

BACKGROUND OF THE INVENTION

1. Field of Technology

The present invention generally relates to a microfilm duplicating apparatus and, more particulaily, to the microfilm duplicating apparatus for duplication micro-images, photographically recorded on a photographic film, onto an unrecorded photographic film.

2. Description of the Prior Art

From, for example, the Japanese Laid-open Patent Publication No. 58-149572 and the U.S. Pat. No. 4,561,769, an electrophotographic microfilming apparatus is well know, the microfilming apparatus disclosed therein makes use of, as shown in FIGS. 10 and 11 of the accompanying drawings, a 2-reel cassette 12 having a length of recording medium (hereinafter referred to as a "recording strip") M accommodated within the cassette 12 with its opposite ends secured to respective reels 13. The recording strip M is comprised of a length of electrophotographic film 14 and a length of magnetic recording tape 15 jointed lengthwise with the length of the electrophotographic film 14, or the film section of the recording strip M, is used to record, on reduced scale, by means of an electrophotographic recording process, a plurality of images of documents desired to be stored, while the length of the magnetic recording tape 15, or the magnetic tape section of the recording strip M, is used to record, by means of a magnetic recording process, retrieval data descriptive of the contents of the respective images of the documents so recorded on the film section 14.

While the microfilming apparatus of the type referred to above and utilizing the 2-reel microfilm cassette is satisfactory, office documentation at different sections or departments of an establishment such as an office, a company or an institute would be expedited if identical recordings of the particular documents are readily available at the respective sections or departments. If only one recording of the documents is available in the establishment, it will often happen that an office clerk belonging to a particular section or department has to resort to the different section or department where the recording is kept.

If recording of documents is made on a photographic material such as, for example, a microfiche or a roll of film utilizing silver halide materials, the identical recordings of the documents can be relatively quickly and efficiently prepared by the use of a well-known contact printing technique wherein an unexposed photographic recording medium is held in contact with the photographic master recording at the time of exposure to the luminous flux and is, thereafter, developed and fixed to produce images identical with those born in the master recording.

However, when it comes to the electrophotograhically recorded microfilm, any technique similar to the photographic contact printing technique cannot be employed in making duplications of the electrophotographically recorded microfilm because the electrophotographic recording system requires a process of electrostatic charging, exposure, development and fixing all sequentially subjected to the electrophotographic recording medium.

In view of the foregoing, when documents are to be recorded or duplicated on the encased electrophotographic recording medium, that is, the electrophotographic recording medium contained in the 2-reel cassette such as shown in and described with reference to FIGS. 10 and 11, the number of the microfilm cassettes required has to be determined before the documents are actually recorded, or very time-consuming and complicated procedures are required at the time the necessity arises for one or more extra microfilm cassettes having the identical recordings of the particular documents. Should one one more extra microfilm cassettes be needed, for example, for distribution to the different sections or departments of the establishmenf, and if the necessity has arisen after one microfilm cassette had been prepared, those jobs which have been executed for the preparation of such one microfilm cassette have to be repeated.

Accordingly, in a microfilm duplication system wherein no contact printing technique can be employed, each of the images recorded on the master microfilm must be optically reproduced at equal magnification and then projected onto the unexposed microfilm for duplicate purpose.

Thus, where the optical system is used, numerous requirements not hitherto encountered have to be satisfied in view of the fact that each frame of the microfilm which bears the respective image to be duplicated is very minute. Such requirements include that the minute image must be reproduced at 1:1 magnification, a high resolution must be attained, and the optical system must be so designed as to cope with various limitations imposed bv the microfilm cassette, where duplication is desired to be made with the use of the previously discussed electrophotographic microfilms encased in the respective cassettes, because of the relationship with the processing head operable to execute an electrophotographic process from the electrostatic charging to the fixing, particularly the relationship with the electrophotographic development, and also because of the presence of limitations resulting from the position of the cassette specified to achieve a stabilized movement of the microfilm.

SUMMARY OF THE INVENTION

Accordingly, the present invention has been developed with a view to providing a novel microfilm duplicating apparatus wherein a compact optical system effective to satisfy the numerous optical and geometrical requirements is employed in order for the images on the master microfilm to be inexpensively and efficiently duplicated on an unexposed microfilm at high resolution.

In order to accomplish the above described object of the present invention, there is provided a microfilm duplication apparatus for duplicating an image, recorded on each of a plurality of frames of the master microfilm, onto a microfilm for duplicate use through a photographic optical system, which system comprises a light source for illuminating the master microfilm from behind, one mirror member for reflecting towards the microfilm for duplicate use a bundle of rays of imagewise light originating from the light source and passing through the master microfilm and, therefore, carrying the image on the master microfilm, and an image forming lens assembly disposed on the path of travel of the imagewise light bundle, the angle defined between a center line of the imagewise light bundle impinging upon the mirror member and a center line of the imagewise light bundle reflected from the mirror member being so selected as to be right angle or an acute angle.

Also, according to the present invention, the image forming lens assembly used in the microfilm duplicating apparatus comprises a pair of image forming lens units of equal focal length each having an objective lens element, said image forming lens units being positioned in spaced relation on an intermediate portion of the optical path between the master microfilm and the microfilm for duplicate use with their objective lens elements confronting with each other.

In the image forming lens assembly, since the image forming lens units of equal focal length each having a focusing distance set at an infinity position are disposed on the optical path between the master microfilm and the microfilm for duplicate use in a unique arrangement, two inexpensive, commercially available lens assemblies can be used for the respective image forming lens units and, accordingly, the photographic optical system having a high resolving power and having a 1:1 magnification can be inexpensively assembled.

Where each of the image forming lens units has a long focal length, the respective positions of the focal points of the associated image forming lens units can be rendered to be close to towards each other, wherefore vignetting of oblique rays can be effectively avoided. Moreover, since an afocal relationship is created between the image forming lens units, no precise optical adjustment of the spacing between the image forming lens units is required.

BRIEF DESCRIPTION OF THE DRAWINGS

These and other objects and features of the present invention will become clear from the following description taken in conjunction with preferred embodiments thereof with reference to the accompanying drawings, in which.

DESCRIPTION OF THE PREFERRED EMBODIMENTS

The first preferred embodiment of the present invention will be described with reference to FIGS. 1 to 14.

Figure 1:
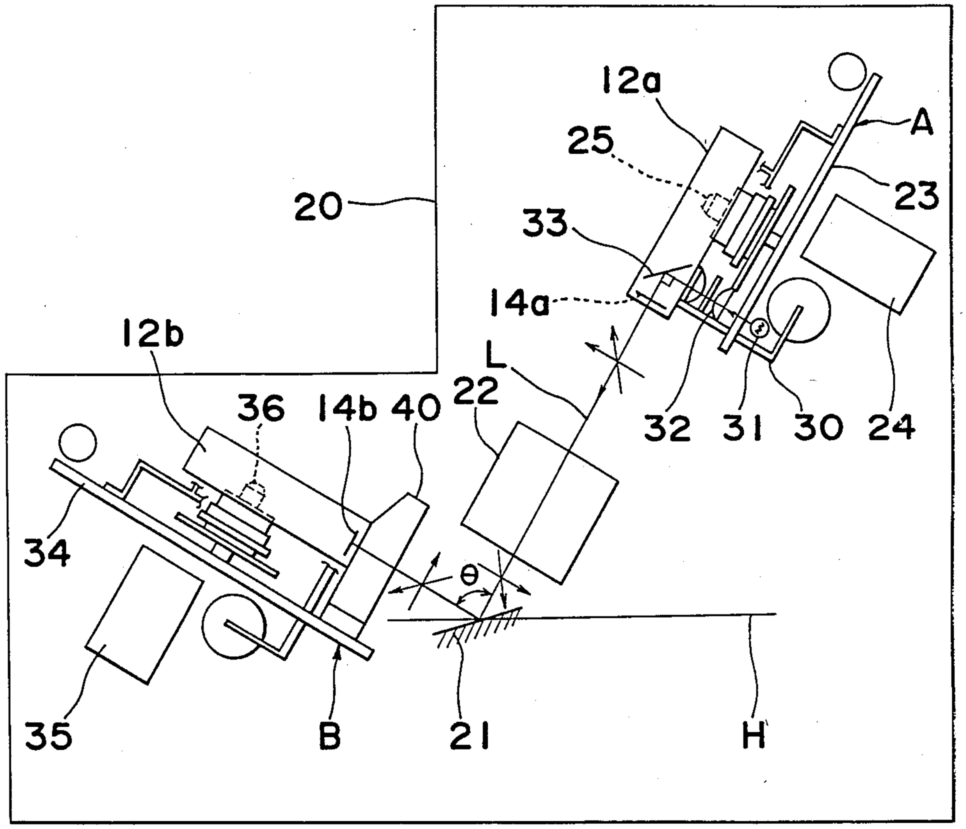
FIG. 1 s a diagram showing a basic construction of a microfilm duplicating apparatus according to a first preferred embodiment of the present invention.

FIG. 1 illustrates a microfilm duplication apparatus embodying the present invention. As shown, a master cassette support and transport means A is arranged at an upper right-hand corner area of a casing 20. This master cassette support and transport means A has a base plate 23 having a pair of rotatable shafts 25 (only one of which is shown) mounted on a generally central portion thereof so as to extend at right angles thereto, and a master cassette 12*a* is supported on the base plate 23 in parallel relation thereto with the rotatable shafts 25 engaged into respective hubs 13 (shown in FIG. 10).

A duplicate cassette support and transport means B is arranged at a lower left-hand corner area of the casing 20 and has a base plate 34 having a pair of rotatable shafts 36 (only one of which is shown) mounted on a generally central portion thereof so as to extend at right angles thereto. A duplicate cassette 12*b* is supported on the base plate 34 in parallel relation thereto with the rotatable shafts 36 engaged into respective hubs 13 in the duplicate cassette 12*b*.

At a generally central portion of the casing 20 there is disposed a reflective mirror 21, forming a part of the photographic optical system used in the microfilm duplicating apparatus, and an image forming lens assembly also forming another part of the photographic optical system.

Both of the direction of transport of a master microfilm strip 14*a* in the master cassette 12*a* and the direction of transport of a duplicate microfilm strip 14*b* in the duplicate cassette 14*a* are rendered to be perpendicular to the plane of a sheet of the drawing depicting FIG. 1.

A bracket 30 secured to the base plate 23 of the support and transport means a carries an illuminator lamp 31, a condensing lens array 32 and a reflective mirror 33 all fitted thereto. Rays of light emanating from the illuminator lamp 31 are condensed by the condensing lens array 32 and then travel towards the reflective mirror 33 by which they are deflected 90° so as to travel towards the master microfilm strip 14*a*. The condensed rays of light impinge upon the master microfilm strip 14*a* at right angles thereto and then pass through the master microfilm strip 14*a* while having illuminated it from rear. A luminous flux L, that is, the rays of light passing through the master microfilm strip 14*a* and carrying an image to be duplicated, has a center line forming an angle of about 60° relative to a horizontal plane H.

The base plate 34 of the support and transport means B carries a processing head 40 capable of executing a series of charging, exposure, developing and fixing processes relative to the duplicate microfilm strip 14*b*.

With the utilization of the processing head 40 the development of the duplicate microfilm strip 14*b* is carried out by applying a developing solution to a light sensitive surface of the duplicate microfilm strip 14*b*. Accordingly, where as shown by the chain line in FIG. 9 the duplicate cassette 12*b* is supported in a manner inclined relative to the horizontal plane H with a film side thereof facing diagonally upwardly, no proper development is possible because the developing solution tends to gather at a lower portion beneath the duplicate microfilm strip 14*b*. On the other hand, where as shown by the single-dotted chain line in FIG. 9 the cassette 12*g* is supported in a manner inclined relative to the horizontal plane H with the film side thereof facing diagonally downwardly, uneven development will occur because no developing solution will be applied uniformly over the duplicate microfilm strip **14*b***.

Figure 9:
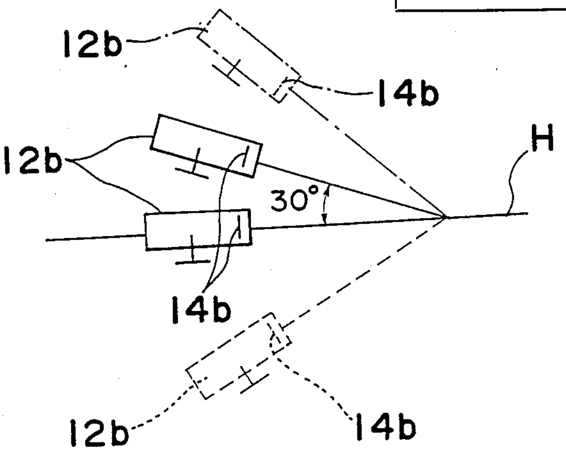
FIG. 9 is an explanatory diagram showing different relative positioning of the master microfilm cassette relative to the microfilm cassette for duplicate use.
Figure 10:
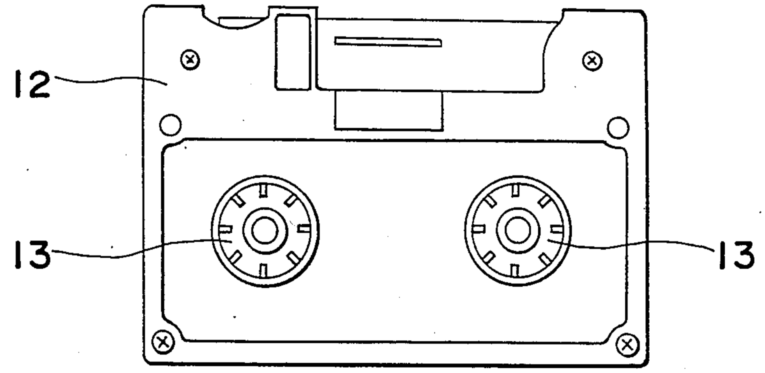
FIG. 10 is a front elevational view of the microfilm cassette useable in the practice of the present invention.
Figure 11:
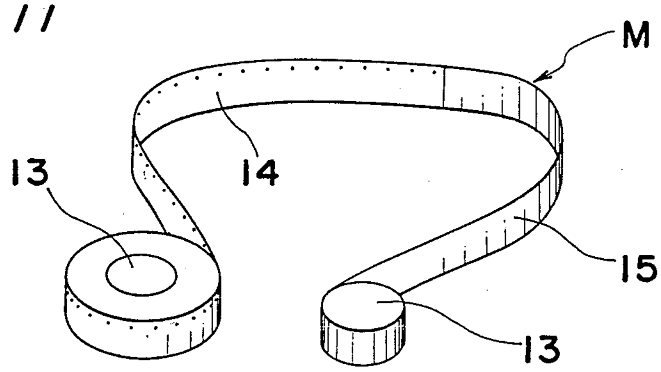
FIG. 11 is a perspective view, on an enlarged scale, showing a length of microfilm strip contained in the microfilm cassette shown in FIG. 10.

In view of the foregoing, the inventors of the present invention have conducted a series of experiments and, as a result thereof, it has been found that a proper development of the microfilm strip **14*b* can be accomplished if the posture of the duplicate cassette 12*b* supported relative to the horizontal plane H is within the range of 0° to about 30° as indicated by the arrow in FIG. 9. It has also been found that, if the duplicate cassette 12*b* is supported in the predetermined posture as described above, the force of friction between the duplicate microfilm strip 14*b* and an inner wall surface of the duplicate cassette 12*b* can be maintained at a proper value enough to permit a stabilized movement of the duplicate microfilm strip 14*b***.

In view of the foregoing, the duplicate cassette **12*b* mounted on the support and transport means B is so positioned as to satisfy a geometrical requirement in which it should be supported inclined within the angle of 0° to about 30° relative to the horizontal plane H as shown in FIG. 9**.

Both of the rotatable shafts 25 in the support and transport means A and the rotatable shaft 36 in the support and transport means B are drivingly coupled with an output shaft of a respective electric D.C. motor 24 or 35, disposed beneath the associated base plate 23 or 34, through any know respective gear train (not shown). When these motors 24 and 35 are driven, the rotatable shafts 25 and 36 are rotated to drive respective ones of the hubs 13 in the master and duplicate cassettes **12*a* and 12*b* thereby to wind up the master and duplicate microfilm strips 14*a* and 14*b*** while the latter are transported frame to frame.

The reflective mirror 21 is disposed on a path of travel of the luminous flux passing through the master microfilm strip **14*a*. By the action of this reflective mirror 21, the luminous flux passing through the master microfilm strip 14*a* is reflected about 90° so as to be projected onto the duplicate microfilm strip 14*b* in the duplicate cassette 12*b* with the image carried by the luminous flux oriented in the same direction as that born in the master microfilm strip 14*a*. In this case, a center line of the luminous flux incident upon the reflective mirror 21 and a center line of the luminous flux reflected by the reflective mirror 21 so as to travel towards the duplicate microfilm strip 14*b* form an angle of about 90° within one vertical plane. It is to be noted that the angle formed between the center line of the luminous flux incident upon the mirror 21 and that reflected from the mirror 21** may be smaller than 90°.

The image forming lens assembly 22 is disposed on a path of travel of the luminous flux from the master microfilm strip **14*a* towards the mirror 21 and has a 1:1 magnification. In other words, the length of the optical path between the master microfilm strip 14*a* to the principal point of the lens assembly 22 and the length of the optical path between the principal point of the lens assembly 22 to the duplicate microfilm strip 14*b* by way of the reflective mirror 21 are selected to be equal to each other. It is, however, to be noted that, if desired, the magnification of the lens assembly 22** may be greater or smaller than 1:1.

Figure 12:
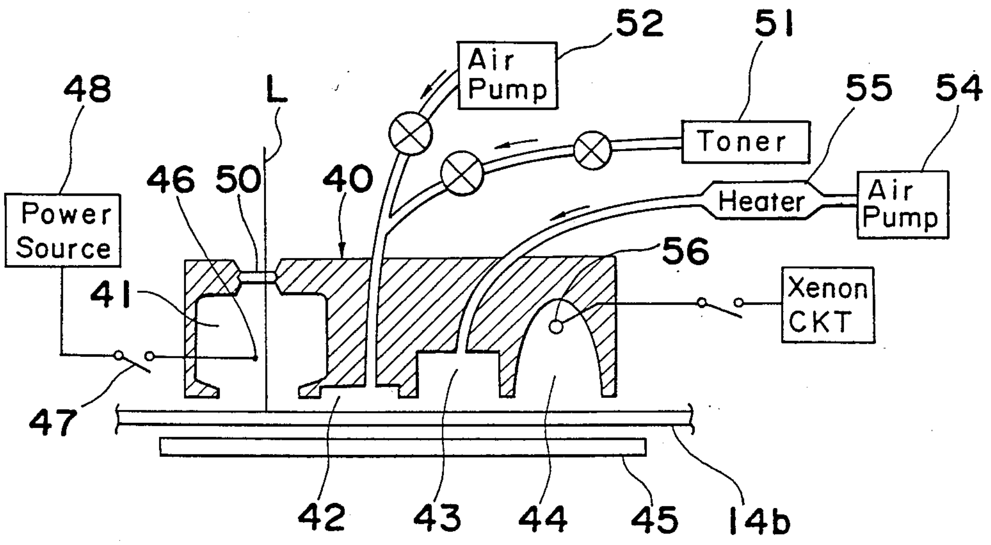
FIG. 12 is a partial sectional view of a processing head used in the apparatus according to the present invention.

The processing head 40 is, shown in FIG. 12, formed with a charging and exposure chamber 41, a developing and dripping chamber 42, a drying chamber 43 and a fixing chamber 44 all defined therein in the order specified above with respect to the direction of transport of the duplicate microfilm strip **14*b***.

Referring to FIG. 12, a film presser plate 45 is supported for movement between an opened position, in which it is separated from the processing head 40 during the frame-to-frame transport of the duplicate microfilm strip **14*b* to permit the movement of the duplicate microfilm strip 14*b*, and a closed position in which it cooperates with the processing head 40 to sandwich the duplicate microfilm strip 14*b* between the presser plate 45 and the processing head 40 while closing the various chambers 41 to 44**.

When a direct current of high voltage is applied from a power source 48 through a switch 47 to a corona wire 46 disposed within the charging and exposure chamber 41, a corona discharge is generated to electrostatically charge the entire surface of one frame of the duplicate microfilm strip **14*b*. The imagewise light bundle L reflected from the reflective mirror 11 is projected onto the electrostatically charged microfilm strip 14*b* through a transparent plate 50 disposed on one side opposite to the opening of the charging and exposure chamber 41. In this way, an electrostatic latent image is formed on the microfilm strip 14*b***.

In the developing and dripping chamber 42, a developing solution containing a toner material is supplied by a pump from a toner bottle 51, the toner material subsequently adhering electrostatically to the area of the microfilm strip **14*b*** where the electrostatic latent image has been formed thereby to complete the development.

A hot air is supplied into the drying chamber 43 from an air pump 54 through a heater 55 for drying the microfilm strip **14*b***.

Within the fixing chamber 44, the image formed on the microfilm strip **14*b* is fixed by a xenon lamp 56**.

With the processing head so constructed as hereinbefore described, the frames of the microfilm strip **14*b* are successively developed, dried and fixed to form the permanently fixed images on the respective frames of the microfilm strip. 14*b*. In particular, when a certain frame of the microfilm strip 14*b* is being fixed, the next succeeding frames of the same microfilm strip 14*b*** are being dried and developed, respectively.

In any event, the processing head utilizable in the practice of the present invention may be of any known construction such as disclosed in, for example, the U.S. Pat. No. 4,600,291.

Hereinafter, the operation of the duplicating apparatus of the construction described hereinabove will be described.

After the master and duplicate cassettes **12*a* and 12*b* have been mounted on the respective support and transport means A and b, the illuminating lamp 31 is lit. The rays of light from this illuminating lamp 31 are projected onto a rear surface of the master microfilm strip 14*a* through the lens array 32 and the reflective mirror 33. The luminous flux having passed through the master microfilm strip 14*a* and carrying the image to be duplicated is introduced into the charging and exposure chamber 41 of the processing head 40 through the lens assembly 22 and the reflective mirror 21 to permit a frame of the light sensitive surface of the duplicate microfilm strip 14*b*** to be exposed.

Thereafter, the drive motors 24 and 35 in the respective support and transport means A and B are driven to transport the master and duplicate microfilm strips **14*a*** and 14*b*, respectively, a distance equal to each frame thereof, in readiness for the next cycle of exposure. While the next succeeding frames of the duplicate microfilm strip 14*b* are exposed, the images on the respective frames of the same duplicate microfilm strip 14*b* which have been formed thereon are developed within the developing and dripping chamber 42, dried within the drying chamber 43 and fixed within the fixing chamber 44.

With the photographic optical system including the illuminating lamp 31, the lens array 32, the mirror 33, the image forming lens 22 and the mirror 21, top, bottom, left-hand and right-hand portions of the image formed by illuminating the master microfilm strip 14*a* from rear with the illuminating lamp 31 are reversed in position by the image forming lens assembly 2 (the relationship of the top, bottom, left-hand and right-hand portions are shown by arrow-headed lines crossing each other in FIG. 1), the top and bottom thereof are then inverted upside down by the mirror 21 while the image is rendered to be a mirror image, the mirror image being then projected onto the duplicate microfilm strip 14*b*. In other words, the real image when viewed from front of the master microfilm strip 14*a* can be projected onto the duplicate microfilm strip 14*b* without being inverted.

The angle $\theta$ formed between the center line of the luminous flux incident upon the mirror 21 and the center line of the luminous flux reflected from the mirror 21 is preferred to be of a value not greater than 90°. In other words, if the angle $\theta$ is greater than 90°, the reflected image in the mirror 21 will be distorted considerably to such an extent as to result in the reduced resolution of the image projected onto the duplicate microfilm strip 14*b*, but if it is not greater than 90°, no practical problem occur substantially.

Figure 13:
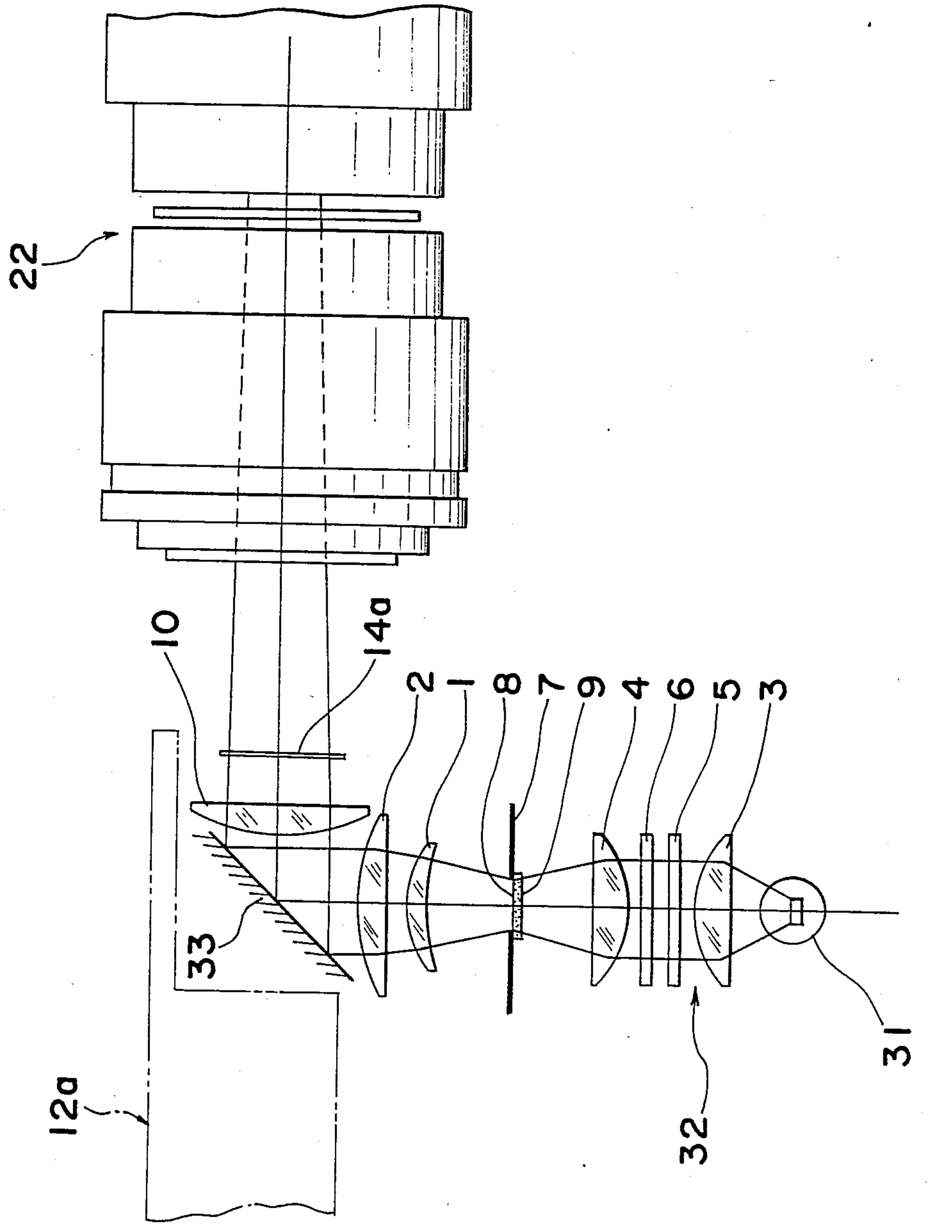
FIG. 13 is a longitudinal sectional view of a light source used in the first embodiment of the present invention.

FIG. 13 illustrates a light source device used in the microfilm duplicating apparatus according to the present invention.

Referring to FIG. 13, reference numeral 31 represents the illumination lamp which may be, for example, a small-size halogen lamp, and reference numeral 32 represents a first condensing lens system which serves to enlarge the rays of light emitted from the illuminating lamp 31, that is, a filament image of the illuminating lamp 31. The first condensing lens system 32 is fixed within a lens barrel (not shown) together with two lens elements 3 and 4, with both of a heat absorbing filter 5 and a color filter 6 being disposed between these lens elements 3 and 4. Reference numeral 7 represents an aperture mechanism having a circular pupil 8, which aperture mechanism 7 is disposed at a position adjacent an image forming point of the first condensing lens system 32. Disposed frontwardly of the pupil 8 of the aperture mechanism 7 is a diffusing plate 9 having a surface area greater than the pupil 8, which diffusing plate 9 is held in contact with the aperture mechanism 7 so as to cover the pupil 8. This diffusing plate 9 is in the from of, for example, a ground glass plate or a non-glaring glass plate. The size of the pupil 8 of the aperture mechanism 7 is so selected that, when the master microfilm strip 14*a* is illuminated through a second condensing lens system as will be described later, the circular cross-section of the luminous flux emerging from the second condensing lens system can cover the diagonal line drawn in the image area on each frame of the master microfilm strip 14*a*.

The second condensing lens system is a lens system operable to condense and enlarge the light bundle which has passed through the pupil 8 of the aperture mechanism 7 and is constituted by two condensing lens elements 1 and 2, both mounted in a lens barrel (not shown), and a condensing lens element 10 mounted in a lens barrel (also not shown). The reflective mirror 33 is interposed between the condensing lens element 2 and the condensing lens element 10 both forming respective parts of the second condensing lens system. Both of the second condensing lens system and the reflective mirror 33 are disposed within the 2-reel cassette 12*a* containing the master microfilm strip 14*a*, but rearwardly of the master microfilm strip 14*a*. With this construction, the bundle of light emerging from the condensing lens elements 1 and 2 of the second condensing lens system is deflected 90° by the reflective mirror 33 so as to illuminate the master microfilm strip 14*a* in the cassette 12*a* from rear. The image carrying luminous flux having passed through the master microfilm strip 14*a* is in turn projected onto the duplicate microfilm strip 14*b* through the image forming lens assembly 22.

The light source device of the above described construction described hereinabove operates in the following manner.

The illuminating lamp 31 is lit when and after the master cassette 12*a* has been mounted on the support and transport means A with the master microfilm strip 14A located at a position ready to be illuminated by the luminous flux from the light source 31. The luminous flux from the illuminating lamp 31 passes through the first condensing lens system 32, and the filament image of the illuminating lamp 31 is formed on the diffusing plate 9 having been enlarged to a size greater than the size of the pupil 8 of the aperture mechanism 7. The luminous flux carrying the enlarged filament image is uniformly diffused by the action of the diffusing plate 9. Accordingly, from the pupil 8 of the aperture mechanism 7 a circular-sectioned luminous flux whose light intensity is uniform over the entire circular cross-section thereof emerges. In this way, the luminous flux from the illuminating lamp 31 can be converted by the first condensing lens system 32, the diffusing plate 9 and the aperture mechanism 7 into the luminous flux having a circular cross-section and also having a predetermined cross-sectional surface area, which circular cross-sectioned luminous flux acts as a secondary light source superseding the illuminating lamp 31.

The luminous flux emerging outwardly from the aperture mechanism 7 is condensed and enlarged by the second condensing lens system before it impinges upon the reflective mirror 33. The luminous flux impinging upon the reflective mirror 33 is deflected about 90° by the mirror 33 so as to illuminate the rectangular image area on each frame of the master microfilm strip 14*a*. Since the luminous flux used to illuminate the master microfilm 14*a* is circular in cross-section and uniform in light intensity over the entire surface area of the cross-section, the luminous flux which has passed through the master microfilm strip 14*a*, that is, a reproduced optical image representative of the image to be duplicated, is of a high quality with no substantial reduction in intensity of the marginal rays of light.

The imagewise luminous flux which has passed through the master microfilm strip 14*a* enters the image forming lens assembly 22 over the entire effective aperture thereof in uniform light intensity and is then projected onto the duplicate microfilm strip 14*b* in the manner as hereinbefore described.

It is to be noted that, by adjusting the degree of diffusion achieved by the diffusing plate 9, the amount of light projected onto the duplicating microfilm strip **14*b***, the unevenness in intensity of the marginal rays of light, etc., can be adjusted.

Thus, when the light source device of the above described construction is utilized in carrying out the duplication of the master microfilm strip **14*a* onto the duplicate microfilm strip 14*b*, even if a light emitting element of the illuminating lamp for illuminating from rear the master microfilm strip 14*a*** for the purpose of forming the projected image on the duplicate microfilm strip is small, the filament image of the illuminating lamp can be enlarged by the first condensing lens system and, at the same time, the luminous flux uniform in light intensity over the entire sectional area can be formed by the diffusing plate, and by causing the luminous flux to enter the image forming lens assembly all over the effective aperture thereof after having been condensed and enlarged by the second condensing lens system, the resolving power of the lenses of the photographic optical system can be effectively exhibited to accomplish the duplication of the images on the duplicate microfilm strip at a high resolution.

Moreover, for the illumination lamp and the first and second condensing lens systems, those for general purpose use can be utilized and, therefore, the manufacturing cost can be reduced.

Hereinafter, various modifications of the first preferred embodiment will be described.

Figure 2:
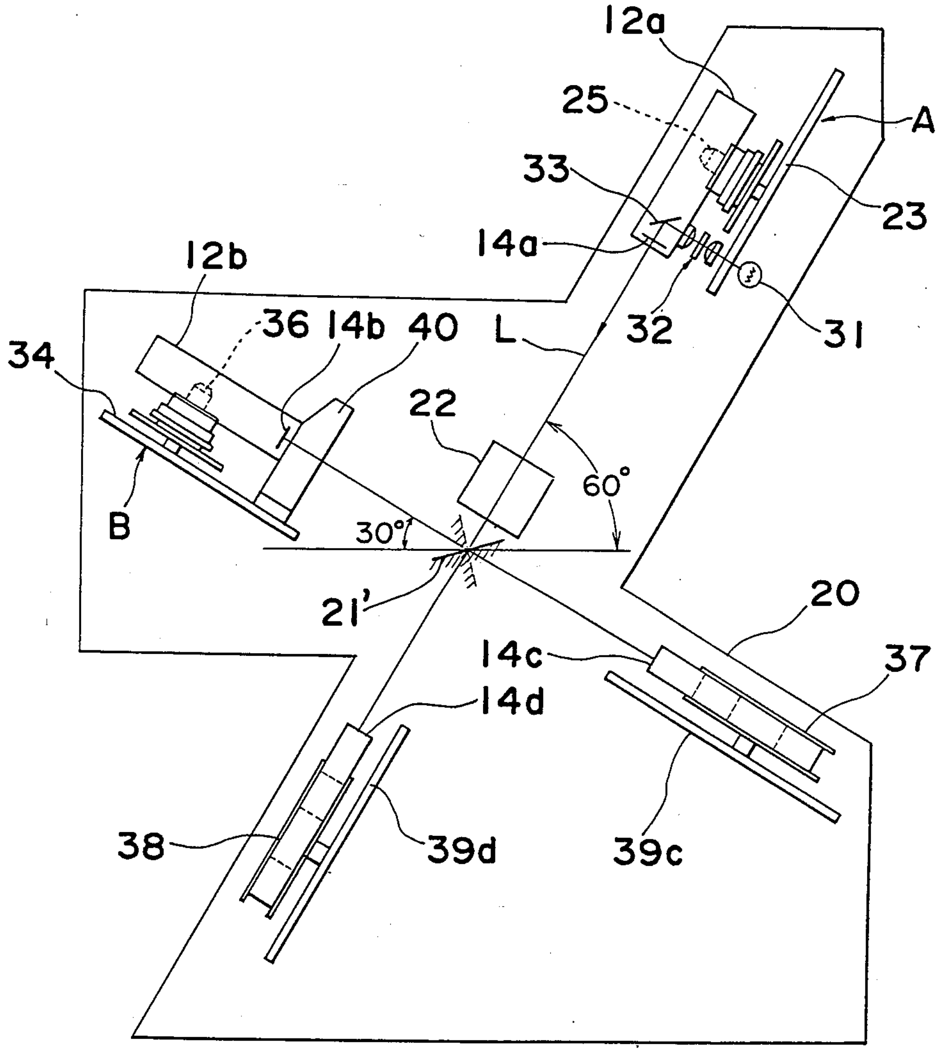
FIG. 2 is a diagram showing a basic construction of the microfilm duplication apparatus according to a second preferred embodiment of the present invention.

The variety shown in FIG. 2 is so designed as to have a capability of duplicating on a roll of silver halide film, in addition to the capability of duplicating on the electrophotographic microfilm strip. According to this variety shown in FIG. 2, in place of the reflective mirror 21 used in the apparatus of the foregoing embodiment, a movable reflective mirror 21' is used, which mirror 21' is supported for rotation about a shaft extending perpendicular to the sheet of the drawing of FIG. 2 and also for movement out of and into the optical path.

On one side of the movable reflective mirror 21' opposite to the support and transport means B for the duplicate electrophotographic microfilm strip 14b and at an optically equivalent position, a support and transport means **39*c* is arranged for the support of a first silver halide film 14*c* reeled at its opposite ends to respective reels, only one of which is shown by 37. Also, on one side of the movable reflective mirror 21' opposite to the support and transport means A for the master electrophotographic microfilm strip 14*a* and at an optically equivalent position, a support and transport means 39*d* is arranged for the support of a second silver halide film 14*d* reeled at its opposite ends to respective reels, only one of which is shown by 38. These first and second silver halide films 14*c* and 14*d*** are accommodated within respective light-shielding casings (not shown).

Where the images on the master electrophotographic microfilm strip **14*a* within the master cassette 12*a* are desired to be duplicated on the duplicate electrophotographic microfilm strip 14*b* within the duplicate cassette 12*b*, the movable mirror 21' is so positioned as shown by the solid line. In such case, the apparatus works in a manner substantially identical with that in the embodiment shown in and described with reference to FIG. 1** and, therefore, the details thereof will not be reiterated.

Where the images on the master electrophotographic microfilm strip **14*a* are desired to be duplicated on the first silver halide film 14*c*, the reflective mirror 21' has to be rotated 90° within the optical path to a position, shown by the phantom line, so that a reflective surface thereof can confront the first silver halide film 14*c*. The luminous flux passing through the master microfilm strip 14*a* is guided towards the first silver halide film 14*c* to project the image on the master microfilm strip 14*a* onto the first silver halide film 14*c*** in the form of a real image.

Where the images on the master microfilm strip **14*a* are desired to be duplicated on the second silver halide film 14*d*, the reflective mirror 21' has to be moved out of the optical path to permit the second silver halide film 14*d* to be exposed to the luminous flux having passed through the lens assembly 22. In this case, since the exposure is effected without the reflective mirror 21' interposed, the mirror image of the image on the master microfilm strip 14*a* can be projected onto the second silver halide film 14*d*. After all of the frames of the second silver halide film 14*d* have been exposed in the manner as hereinabove described, the second silver halide film 14*d*** is developed and fixed in any known manner to produce negative film. When using this negative film an additional duplication is carried out in any known photographic contact printing process to produce a positive film bearing the image in the form of a real image.

If the above described duplicate film is accommodated within a 2-reel cassette similar to that described hereinbefore in connection with any one of the microfilm strips **14*a* and 14*b***, the resultant 2-reel cassette containing the duplicated film can be used in a manner similar to the 2-reel cassette containing the electrophotographic microfilm strip.

Figure 3:
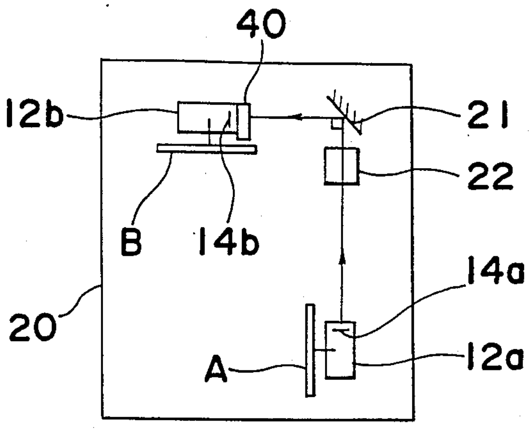
FIGS. 3 to 8 are schematic diagrams showing respective modified forms of the microfilm duplicating apparatus according to the present invention.

The variety schematically shown in FIG. 3 differs from the embodiment shown in FIG. 1 in that the support and transport means A for the master microfilm cassette 12 is supported inclined about 90° relative to the horizontal plane H. According to the arrangement shown in FIG. 3, since the reflective surface of the mirror 21 is oriented downwards, any possible adherence of dust to the reflective surface of the mirror 21 can be advantageouslv avoided, thereby effectively minimizing any possible reduction in performance of the photographic optical system.

Figure 4:
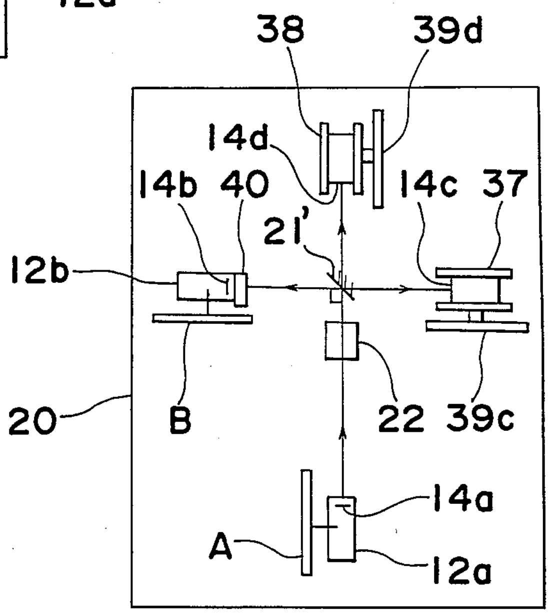

The variety shown in FIG. 4 is a version of the system of FIG. 3 modified so as to permit the apparatus to have a capability of making a duplication on a silver halide film in a manner similar to that in the variety of FIG. 2.

Figure 5:
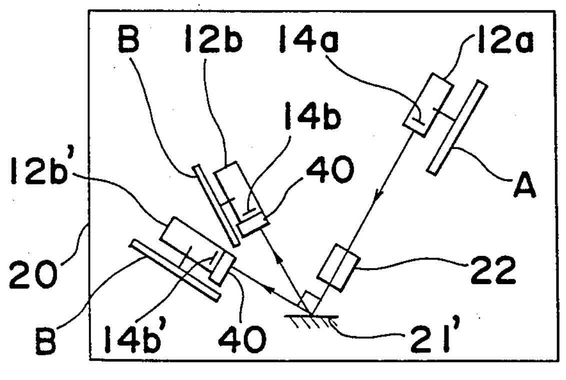

The variety shown in FIG. 5 is so designed that with the use of one master cassette **12*a* the duplication can be made on two electrophotographic microfilm strips 14*b* and 14*b'*** simultaneously.

Figure 6:
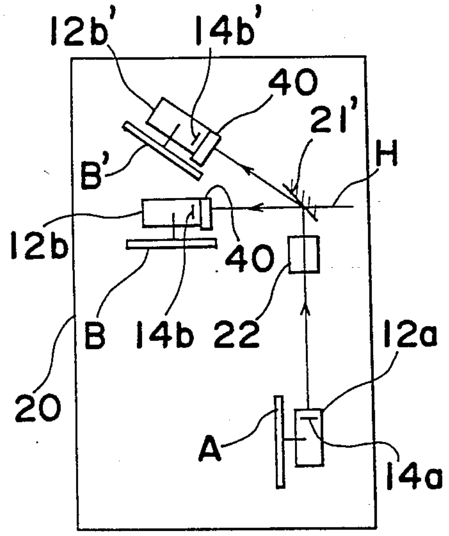

The variety shown in FIG. 6 is a version of the system of FIG. 5 wherein the position of the master cassette **12*a* is altered in a manner similar to that shown in FIG. 3**.

It is to be noted that, in each of the systems shown in FIGS. 5 and 6, respectively, the use of the two duplicate cassettes **12*b* and 12*b'*** has been shown, but three or more duplicate cassettes may be employed.

Figure 7:
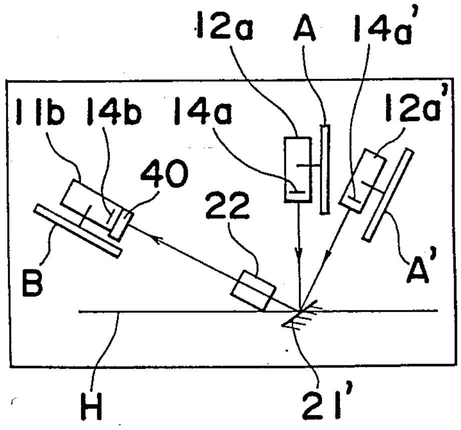

The variety shown in FIG. 7 is such that two master microfilm cassettes **12*a* and 12*a'* are used for enabling selected ones of the images on the master microfilm strip within the master cassette 12*a* and also selected ones of the images on the master microfilm strip within the other master cassette 12*a'*** to be duplicated on the duplicate microfilm strip 14*b* within the duplicate cassette 12*b*.

Figure 8:
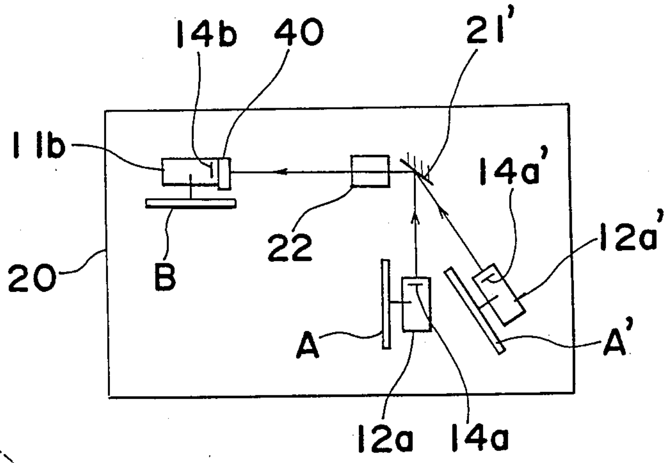

The variety shown in FIG. 8 is a version of the system of FIG. 7 wherein the two master cassettes 12*a* and 12*a'* are mounted beneath the horizontal plane H.

It is to be noted that, while the varieties shown in FIGS. 7 and 8 are so designed as to make use of the two master cassettes 12*a* and 12*a'*, they can be designed so as to make use of three or more master cassettes.

From the foregoing, it has now become clear that, since the photographic optical system used in the microfilm duplication apparatus according to the first preferred embodiment of the present invention is comprised of three components, that is, the illuminating light source device for illuminating the master microfilm, the reflective mirror and the image forming lens assembly, the apparatus as a whole can be assembled in a compact size and the optical adjustment can be accomplished easily.

More particularly, since the number of reflective mirrors is minimized, that is, only one reflective mirror is used, and since the center line of the luminous flux incident upon the reflective mirror and the center line of the luminous flux reflected from such reflective mirror are rendered to form an acute angle or a right angle, the images on the master microfilm strip can be duplicated at a high resolution.

Hereinafter, the second preferred embodiment of the present invention will be described with reference to FIGS. 14 to 16.

Figure 14:
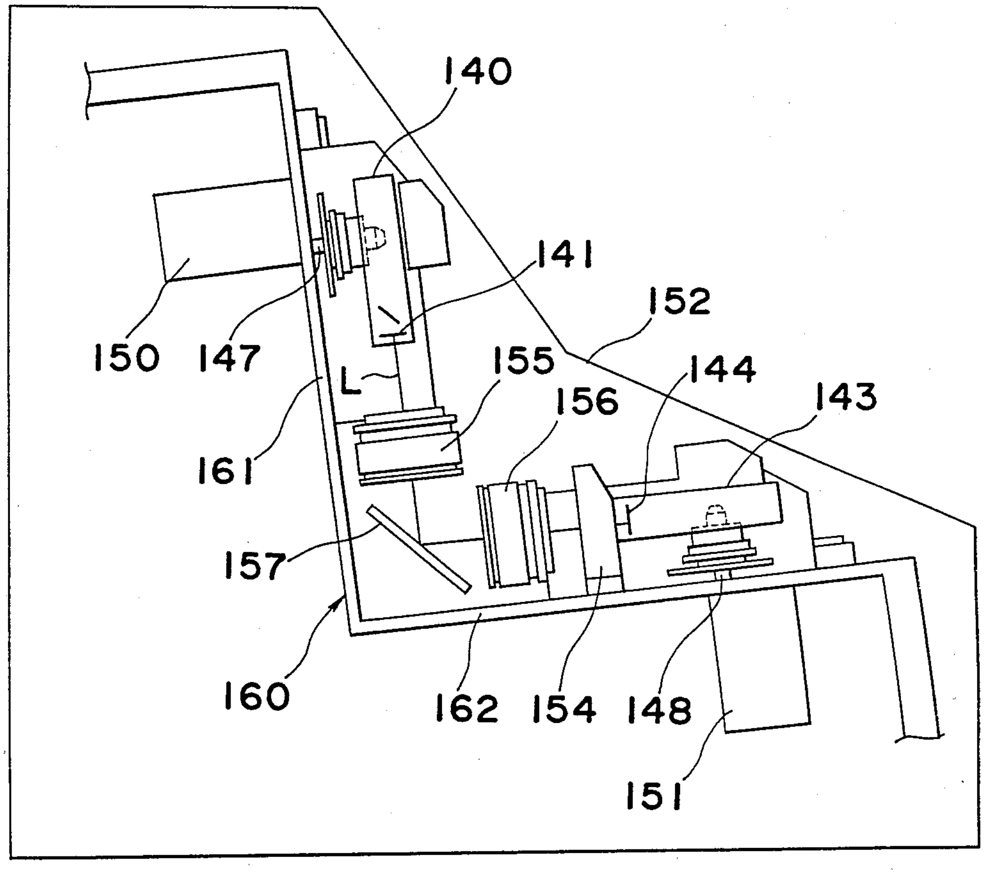
FIG. 14 is a schematic side view of the microfilm duplicating apparatus according to a second embodiment of the present invention.

FIG. 14 illustrates the apparatus operable with the electrophotographic microfilm strips. As shown therein, a generally L-shaped base plate 160 is arranged within a casing 152. A master cassette 140 accommodating therein the reeled electrophotographic microfilm strip 141 is supported in a generally vertical position on a vertical portion 161 of the base plate 160, and the master microfilm strip 141 within the master cassette 140 can be transported frame-to-frame by a drive shaft 147, driven by a motor 150, in a direction perpendicular to the plane of the drawing of FIG. 14.

A horizontal portion 162 of the base plate 160 carries a duplicate cassette 143 containing the duplicate microfilm strip 144 supported in a generally horizontal position, and the duplicate microfilm strip 144 within the duplicate cassette 143 can be transported frame-to-frame by a drive shaft 148, driven by a motor 151, in a direction perpendicular to the plane of the drawing of FIG. 4.

A processing head 154 for performing development and fixing of images duplicated on the duplicate microfilm strip 144 within the duplicate cassette 143 is mounted in front of the duplicate cassette 143.

First and second image forming lens units 155 and 156 are mounted in front of the master cassette 140 on the vertical portion 161 of the base plate 160 and in front of the duplicate cassette 143 on the horizontal portion 162 of the same base plate 160, respectively. A reflective mirror 157 for deflecting the path of travel of light at right angles between the master and duplicate cassettes 140 and 143 is interposed between the first and second image forming lens units 155 and 156.

Figure 16:
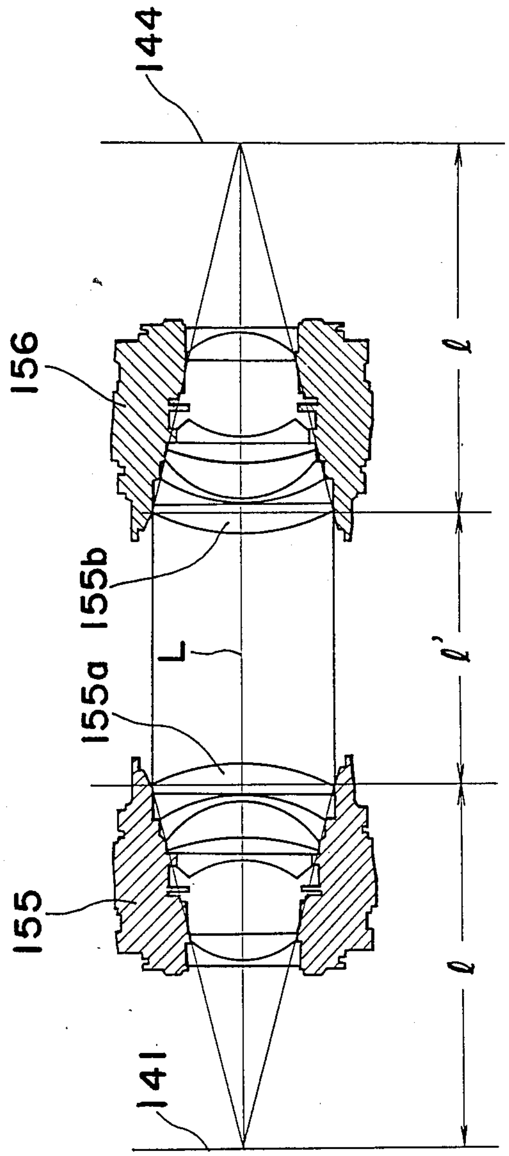
FIG. 16 is a longitudinal sectional view of an image forming lens assembly.

As shown in FIG. 16, the first and second image forming lens units 155 and 156 have respective objective lenses 155*a* and 156*a* of equal focal length l which are positioned in face-to-face relationship and are positioned at a position intermediate of the optical path between the master and duplicate microfilm strip 141 and 144. Accordingly, if each of the lens units 155 and 156 is set to focus at an infinity position, a photographic optical system having a magnification of 1 can readily be assembled.

Also, any one of the lens units 155 and 156 may be of a commercially available type that is inexpensive and, therefore, the inexpensive photographic optical system having a high resolving power can be constructed with the use of the commercially available lens units. In addition, by separating the lens units 155 and 156 by a distance l', a freedom of choice can be obtained in designing the layout.

Figure 15:
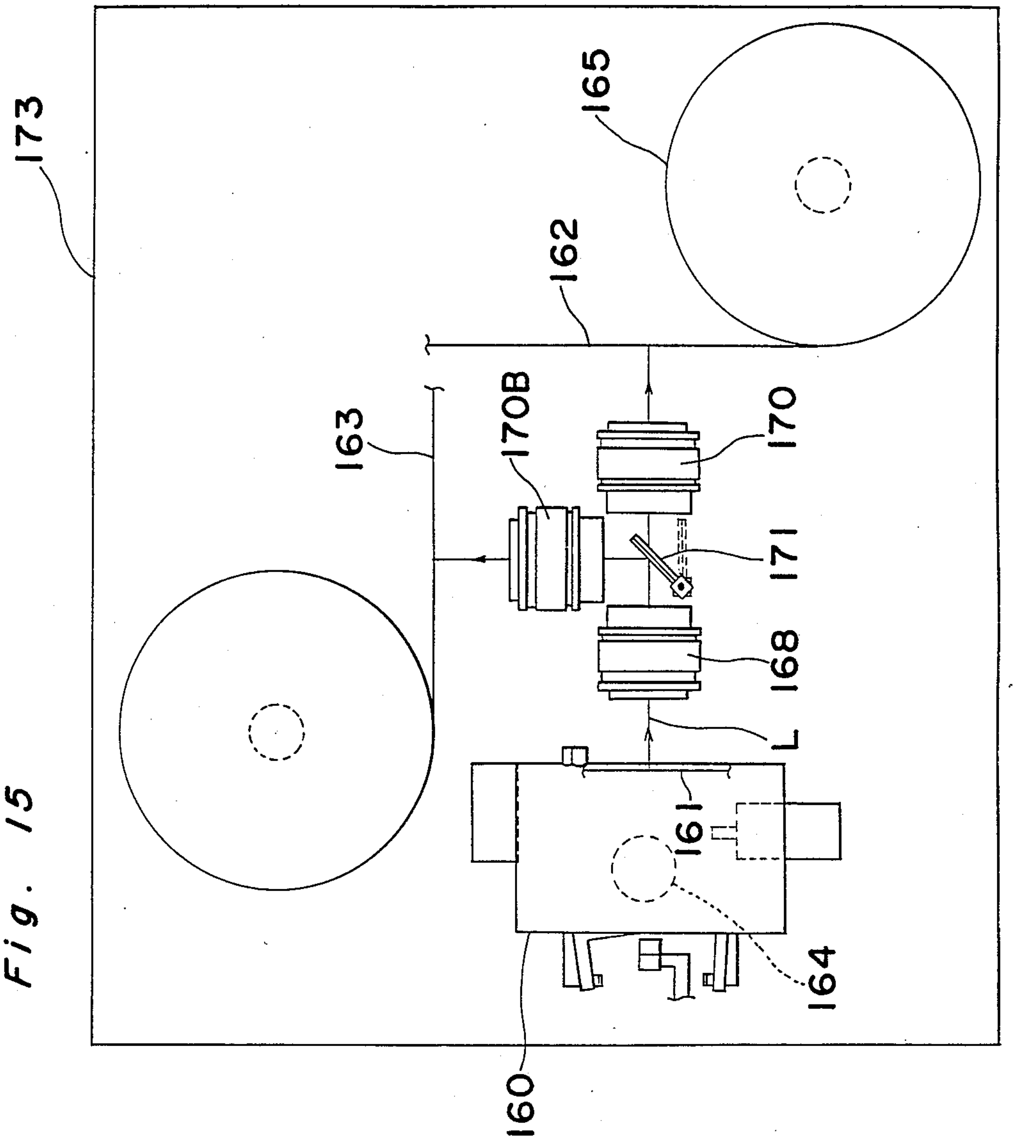
FIG. 15 is a top plan view of the modified form of the microfilm duplicating apparatus shown in FIG. 14.

FIG. 15 illustrates a modification of the second preferred embodiment of the present invention wherein arrangement has been to enable the utilization of the silver halide film in place of the duplicate electrophotographic microfilm strip.

As shown in FIG. 15, within a casing 173, a master microfilm strip 161, a first silver halide film 162 and a second silver halide film 163 are disposed at a left-hand portion, a right-hand portion and a center deep portion, respectively, of the casing 173 so that images on the master microfilm 161 can be duplicated on the first silver halide film 162 in the form of mirror images and on the second silver halide film 163 in the form of real images.

The first silver halide film 162 having the master image duplicated in the form of the mirror images is again duplicated by the use of any known contact printing process on a similar silver halide film so that the real images corresponding to the mirror images can be formed on such similar silver halide film. It is to be noted that any one of the master microfilm strip 161 and the duplicated films may be an electrophotographic film, a silver halide film, a diazo film or a basicular film or a combination thereof.

The master microfilm strip 161 is accommodated within a cassette 160 and is adapted to be transported frame-to-frame by a drive motor 164.

The first silver halide film 162 is reeled to a pair of reels 165 and is adapted to be guided by a plurality of guide rollers while being transported by a pinch roller in cooperation with a capstan in a direction deep into the casing 173. Similarly, the second silver halide film 163 is also transported in a direction leftwards and rightwards, as viewed in FIG. 15, within the casing 173.

A reflective mirror 171 is disposed between the cassette 160 and the first silver halide film 162 for rotation through 45° about a shaft between a reflecting position, in which the luminous flux L is deflected 45° so as to travel towards the second silver halide film 163, and a nonreflectiing or retracted position in which the luminous flux L travels directly towards the first silver halide film 162.

A first image forming lens unit 168 and a second image forming lens unit 170A and another second image forming lens unit 170B are arranged between the cassette 160 and the reflective mirror 171, between the reflective mirror 171 and the second silver halide film 163, respectively.

The image forming lens units 168, 170A and 170B have respective objective lenses of equal focal length which are positioned in face-to-face relationship and are arranged at a position intermediated of the optical path between the master microfilm strip 161 and the silver halide films 162 and 163.

In view of the foregoing, even in this modification shown in FIG. 15, if each of the lens units 168, 170A and 170B is set to focus at an infinity position, a photographic optical system having a magnification of can readily be assembled.

Although the present invention has been described in connection with the preferred embodiments thereof with reference to the accompanying drawings, it is to be noted that various changes and modification are apparent to those skilled in the art. Such changes and modifications are to be understood as included within the scope of the present invention as defined by the appended claims unless they depart therefrom.

What is claimed is:

1. A microfilm duplication apparatus for duplicating images, recorded on a master film, onto a duplicate film, which apparatus comprises:

a light source means for illuminating any one of the images on the master film from rear;

a single mirror member for reflecting a luminous flux, which has been emitted from the light source means and passed through the master film while carrying the image to be duplicated, so as to travel towards the duplicate film; and an image forming lens means disposed on the path of travel of the luminous flux;

said mirror memeber being so disposed that the luminous flux incident upon the mirror member and the luminous flux reflected from the mirror member forms an angle no greater than a right angle, and wherein said image forming lens means comprises a pair of image forming lens units of equal focal length each having an objective lens element, said lens units being arranged with respective objective lens elements facing each other and at a position intermediate of the path of travel of the luminous flux, and wherein the image forming lens units of equal focal length each have a focusing distance set at infinity thereby providing a photographic optical system of high resolving power with a one to one magnification anf constituting an inexpensive assembly, whereby, the close positioning of the dual image forming lens units thereby avoids vignetting of oblique rays with an afocal relationship created between the image forming lens units eliminating the need for precise optical adjustment of the spacing between the image forming lens units.

2. The apparatus as claimed in claim 1, wherein at least the duplicate film is accomodated within a cassette, wherein the duplicate cassette is supported relative to the horizontal plane within the range of zero to about 30° relative to the horizontal plane, wherein the duplicate folm comprises a microfilm strip, said duplicate film carrying cassette had an inner wall surface in contact with the duplicate microfilm strip, whereby, with the duplicate cassette supported within the range of 0° to about 30° relative to the horizontal plane, the force of friction between the duplicate microfilm strip and the inner wall surface of the duplicate cassette is maintained at a value capable if effecting stablized movement of the duplicate microfilm strip.

3. The apparatus as claimed in claim 1, wherein both the master film and the duplicate film are accommodated within respective cassettes and wherein at least the duplicate film is an electrophotographic film.

4. The apparatus as claimed in claim 1, wherein said light source means comprises an illuminating lamp; and wherein said apparatus further comprises a first condensing lens member for condensing and enlarging rays of light emitted from the illuminating lamp; a diffusing plate condensing lens member; and a second condensing lens member for condensing the rays of light diffused by the diffusing plate and wherein the rays of light which have been condensed by the second condensing lens member enter the image forming lens means in an uniform intensity over the entire effective aperture of the image forming lens means.

* * * * *